(No Model.)
J. MEIER.
ATTACHMENT FOR CULTIVATORS.
No. 519,408. Patented May 8, 1894.
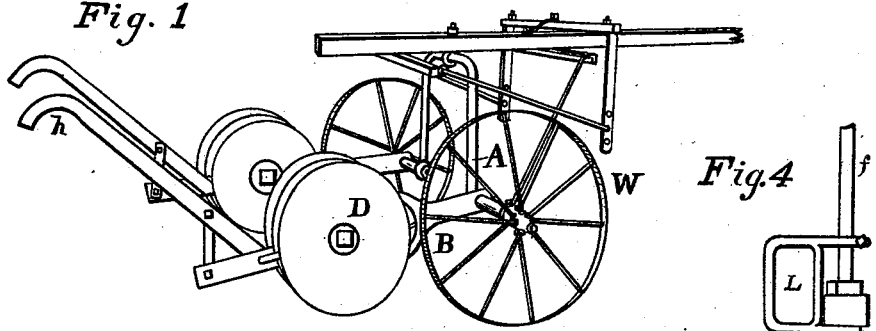
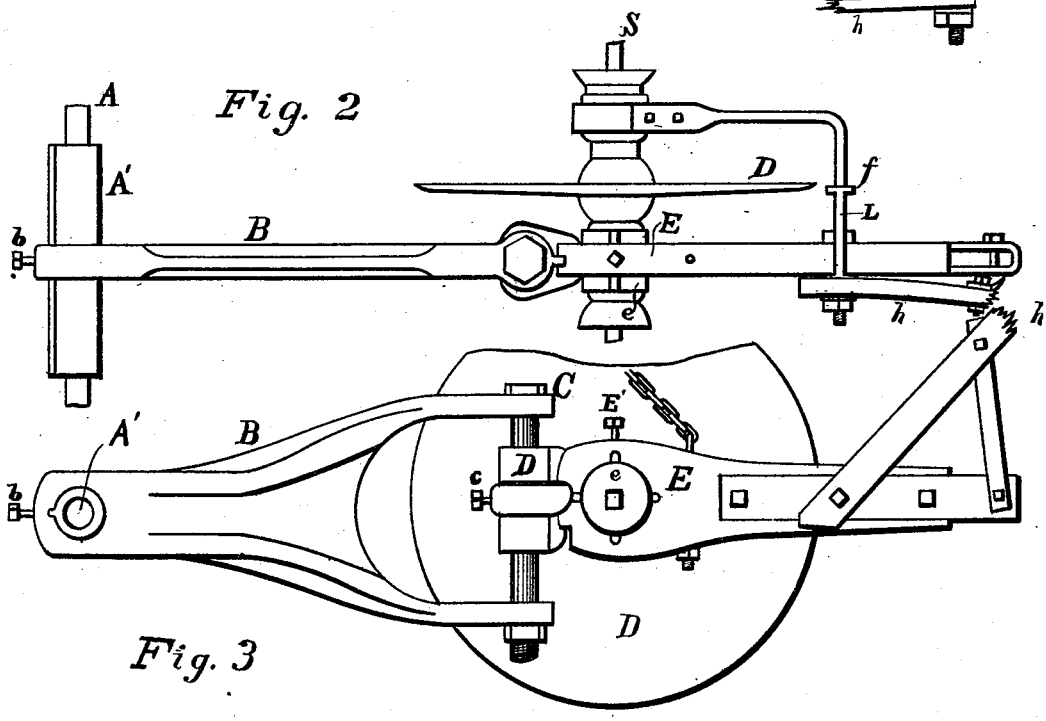
Witnesses
W. A. H. Darling
Wm. H. Cochran
Inventor
Joseph Meier
by
Harold A. Weld, Atty

UNITED STATES PATENT OFFICE.

JOSEPH MEIER, OF ROCK ISLAND, ILLINOIS.

ATTACHMENT TO CULTIVATORS.

SPECIFICATION forming part of Letters Patent No. 519,408, dated May 8, 1894.

Application filed June 29, 1893. Serial No. 479,184. (No model.)

*To all whom it may concern:*

Be it known that I, JOSEPH MEIER, a citizen of the United States, residing at Rock Island, in the county of Rock Island and State of Illinois, have invented a certain new and useful Attachment to Cultivators, of which the following is such a full, clear, and exact description as will enable others skilled in the art to which it appertains to make and use the same.

My invention relates to that class of cultivators having an axle and wheels for the support of the framework of the machine; and the object of my invention is to provide gangs of revolving disks, under the control of the operator, in the place and stead of the plows or shovels ordinarily employed for the purpose of plowing and stirring the surface of the ground.

In the drawings accompanying and forming part of this specification, Figure 1, is a perspective view of a cultivator equipped with my attachment. Fig. 2, is a plan view of the attachment with a part of the handle and of the disk gang broken away. Fig. 3, is a side view of the attachment. Fig. 4, is a detail view, showing the loop L, upon the brace.

In the drawings the same character of reference refers to the same part in the several views.

On the horizontal portion of the cylindrical axle A of the cultivator, near the wheel, W, is fitted a box, A′, which is cylindrical in its inner surface, and fits the axle like a sleeve so as to revolve about it. The coupling beam B fits over the box A′ and by means of the set screw b, may be secured to the box at any desired distance from the wheel W. The coupling beam B, being thus firmly secured to the sleeve A′ is free to rotate with the sleeve about the axle as a horizontal pivot. The rear portion of the coupling beam is bifurcated into a ⊃ shaped extremity, of which the upper and lower jaws are connected by the vertical pivot bolt, C. The sleeve D moves vertically upon the pivot bolt C, and may be secured at any desired position upon it by means of the set-screw c. The disk beam E is bolted or otherwise firmly and rigidly secured to the sleeve D. It is evident that the disk beam may have horizontal motion imparted to it, about the pivot bolt C, independently of the coupling beam, and that the two beams may be raised or lowered together since they are free to move upon the axle as a pivot. The disk beam E carries the journal box e, which may be moved in or out at right angles to the disk beam, and held in any desired position by the set screw E′. In the box e is journaled the disk shaft S which carries a gang of three or other convenient number of concavo-convex disks, D, separated from each other upon the shaft by spools, and revolving with the shaft in the manner usual in disk harrows. From a point on the disk beam E, in the rear of the disks, D, the brace F extends at right angles to the disk beam in the direction of the wheel, for a convenient distance, and then bends to a direction parallel to the disk beam, and extends forward and carries a box, in which also is journaled the disk shaft, S. The handle h is bolted and braced to the rear of the disk beam so that one walking behind the cultivator is able to grasp the handle and move the disk beam, and with it the gang of disks, vertically or horizontally at will. The operator, walking behind, by grasping the handles can operate the gangs of disks in the same manner that the shovels or plows of ordinary walking cultivators are operated. The gangs of revolving disks agitate and stir the surface of the ground, and are adapted to cultivate in the manner described on each side of a row. The coupling beams may be adjusted nearer together or farther apart by means of the set-screw c. A loop, L is fixed upon each brace F. The operator if he desires may mount upon the braces and stand with one foot in each loop. He may then dispense with the handles and operate the disk beams and gangs of disks with his feet. The handles may or may not be unbolted and removed from the disk beams when the cultivator is operated in this manner.

Having thus described my invention, what I claim as new, and desire to secure by Letters Patent, is—

1. An attachment to a cultivator consisting of two separate parts, similar each to each and operating in conjunction, each consisting of a combination of a coupling beam B pivot bolt C, sleeve D vertically adjustable upon said pivot bolt, disk beam E, gang of revolving disks D, brace $f$ and loop L.

2. In an attachment to cultivators, the combination of a sleeve A' upon the axle of the cultivator, the coupling beam B, pivot bolt C, disk beam E, gang of disks D, brace $f$, loop L, and handle H.

3. The combination with a cultivator having axle and wheels, of two gangs of revolving disks journaled in disk beams and braces, coupling beams moving upon said axle as a horizontal pivot and being connected with said disk beams by vertical pivots, braces bearing loops, and handles, all as set forth.

4. In an attachment to cultivators, the combination of a sleeve A' upon the axle of the cultivator, the coupling beam B, pivot bolt C, disk beam E, gang of disks D, brace $f$ and loop L, as described.

JOSEPH MEIER.

Witnesses:
HAROLD A. WELD,
GEO. HUNT.